Aug. 25, 1931.  W. R. HUME  1,820,139
ELECTRIC WELDING MACHINE
Filed May 16, 1928    6 Sheets-Sheet 1
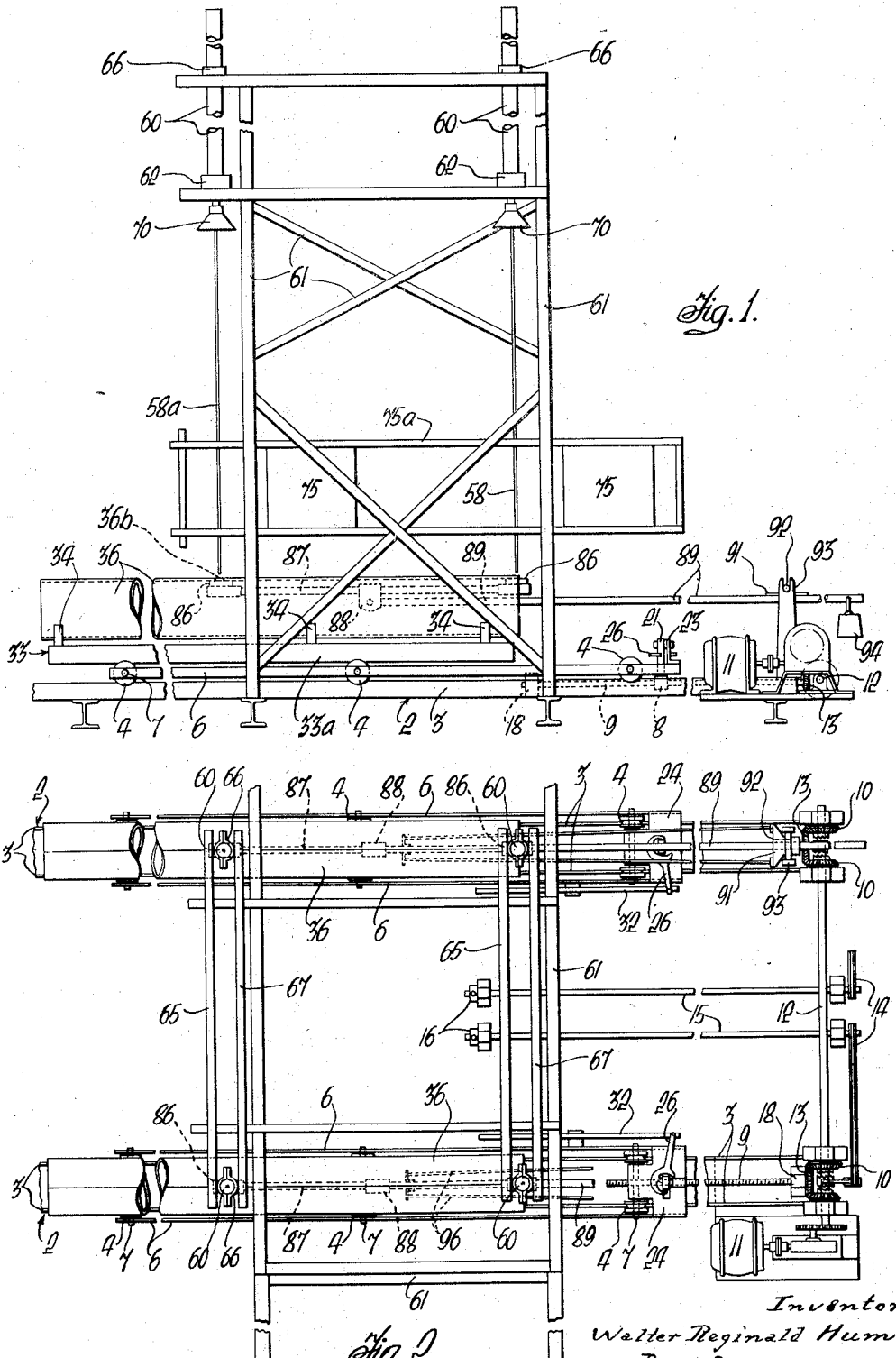

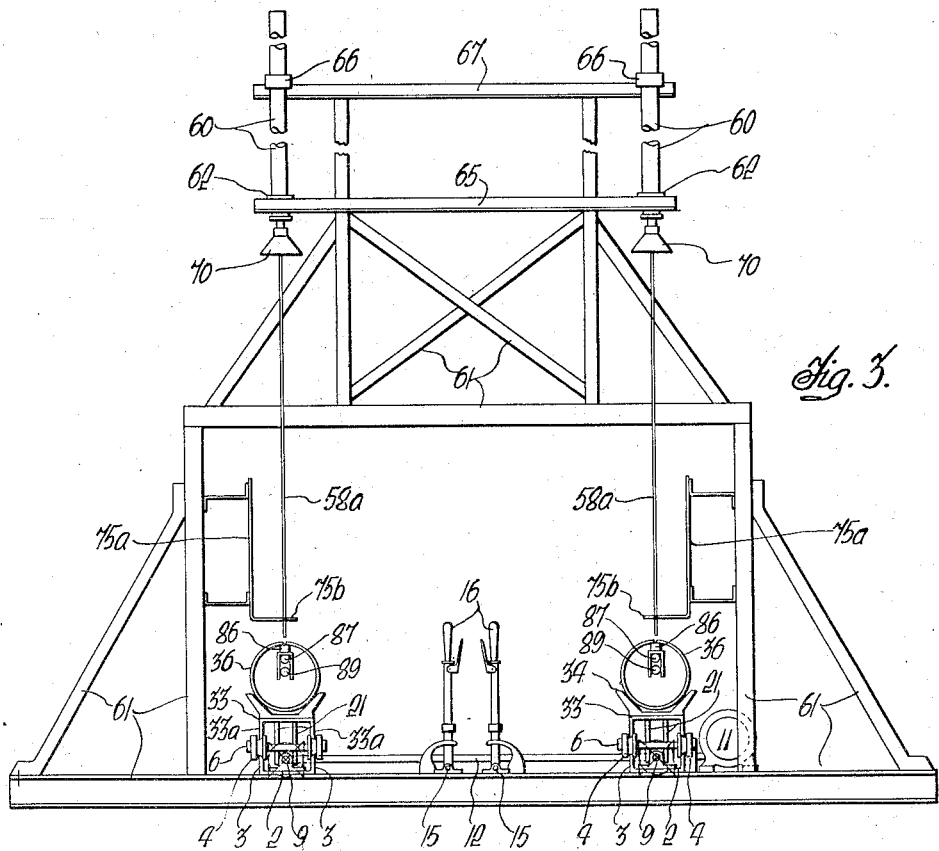
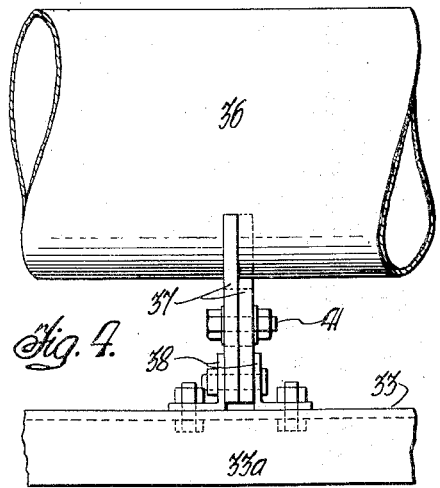
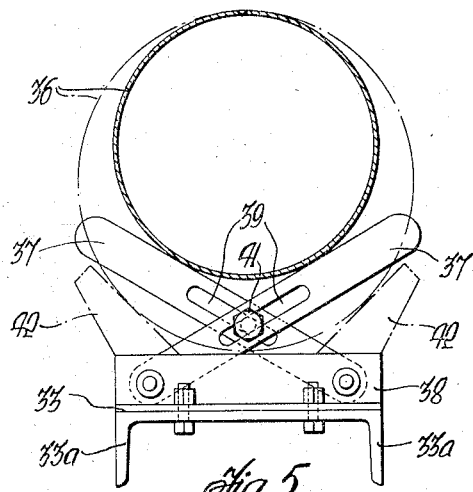

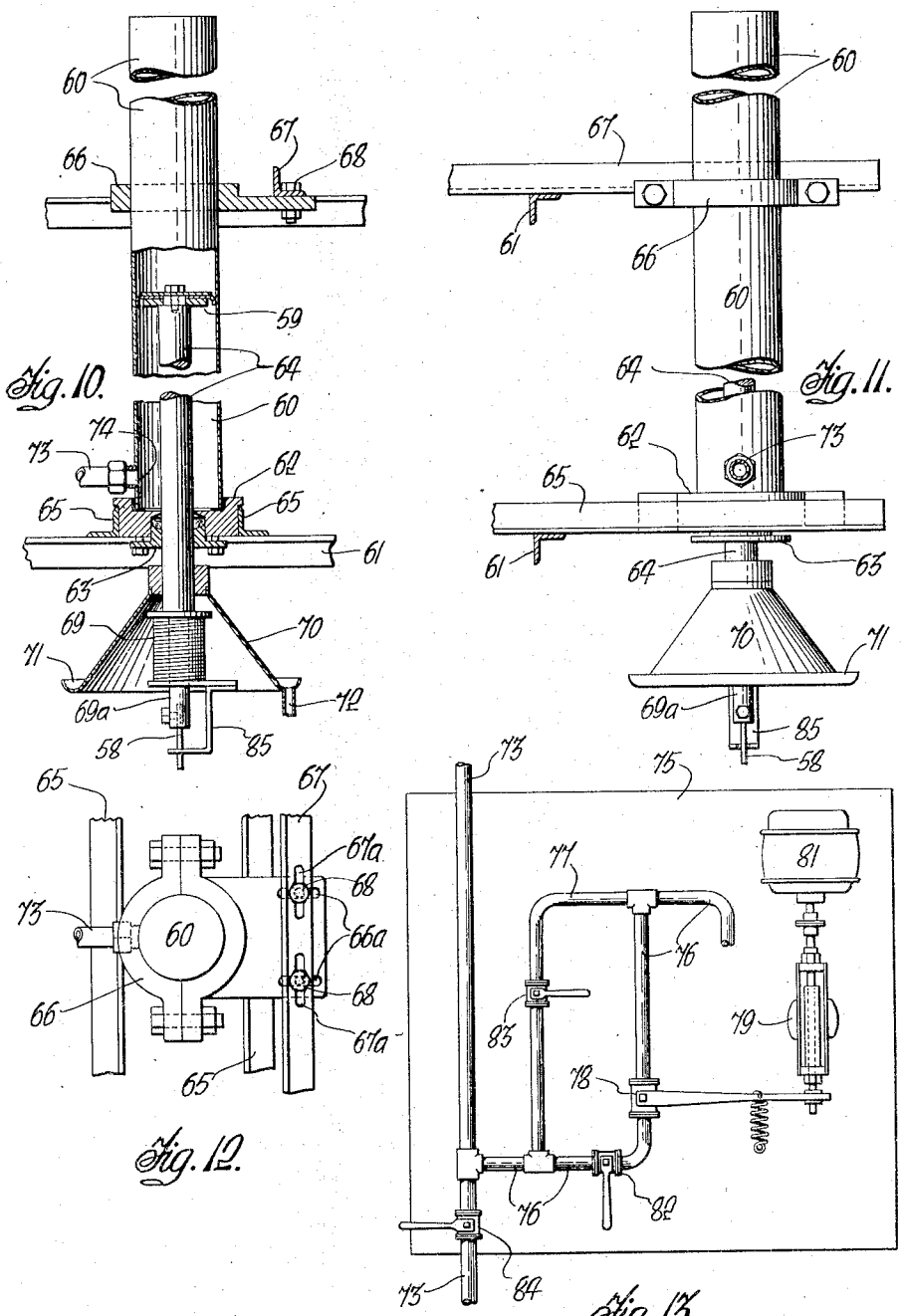

Inventor:
Walter Reginald Hume
By
Attorney.

Aug. 25, 1931.    W. R. HUME    1,820,139
ELECTRIC WELDING MACHINE
Filed May 16, 1928    6 Sheets-Sheet 6

Inventor:
Walter Reginald Hume
By *[signature]*
Attorney.

Patented Aug. 25, 1931

1,820,139

UNITED STATES PATENT OFFICE

WALTER REGINALD HUME, OF MELBOURNE, VICTORIA, AUSTRALIA

ELECTRIC WELDING MACHINE

Application filed May 16, 1928, Serial No. 278,210, and in Australia May 21, 1927.

This invention relates to electric arc welding machines.

One of the objects of the invention is to provide an improved arrangement for traversing the work in relation to the electrode whereby a steady and reliable feed motion is ensured by the aid of a simple and inexpensive apparatus.

Another object of the invention is to provide improvements relative to the supporting and chilling of the molten metal behind or beneath the work as it is fused by the heat at the arcing point. Such improvements embody one or more bearers or backing members which are adapted to bear against the back or underside of the work beneath the electrode, said bearer or bearers being mounted on a pivoted arm or lever whereby each bearer is kept pressed against the work at the desired point relative to the electrode.

A further object of the invention is to provide an improved method and means of arc welding embodying the simultaneous use of a plurality of electrodes on the same joint, such as the longitudinal joint of a sheet metal pipe. By thus employing two or more electrodes simultaneously on the same joint, an important advantage is obtained in that the stress set up in the weld by the contraction of the metal as it solidifies, is reduced to a minimum, the meeting edges of the curved pipe blank being simultaneously drawn together or united at a plurality of points so that the stress in the molten metal is reduced according to the number of electrodes employed.

A still further object of the invention is to provide an automatic arc welding machine embodying a plurality of electrodes and work carriages, the latter being arranged to move longitudinally and in parallel relationship whereby a plurality of longitudinal joints, as for instance in the manufacture of metal pipes, may be simultaneously formed under the care of a single operator or attendant who may be conveniently located between the pipes. Means may also be provided to simultaneously traverse a series of parallel metal pipes or like objects circumferentially and preferably in opposite directions, so that a plurality of circumferential joints may be simultaneously formed under the care of a single attendant as abovementioned.

The invention also embodies an improved hydraulic electrode feeding arrangement whereby the electrode under the influence of gravity acting on a hydraulic plunger which is disposed above the work and is adapted to force fluid from a cylinder into which the fluid is admitted to again lift the plunger when desired.

The foregoing and other objects and features of the invention, will, however, be hereinafter more fully described.

Referring to the drawings which form part of this specification:—

Figure 1 is a contracted side elevation of apparatus in accordance with the invention. Certain parts are omitted for convenience of illustration.

Figure 2 is a plan of the apparatus as seen in Figure 1.

Figure 3 is an end view of the apparatus.

Figure 4 is a detail view in side elevation of means for supporting a pipe or the like while it is operated on in accordance with this invention.

Figure 5 is an end view of said pipe supporting means.

Figure 10 is a contracted side elevation, partly in section, of improved hydraulic feeding means for electrodes.

Figure 11 is an external view of the electrode feeding means in a plane at right angles to that of Figure 10.

Figure 12 is a plan of Figure 10.

Figure 13 is a front view of a panel fitted with means for automatically regulating the rate of feed of an electrode.

Figure 20 is a fragmentary side elevation of apparatus similar to that seen in Figures 1 to 3, adapted for the welding of circumferential pipe joints, or the like.

Figure 23 is a contracted side elevation of a modified apparatus for the welding of circumferential pipe joints, or the like.

Figure 6:
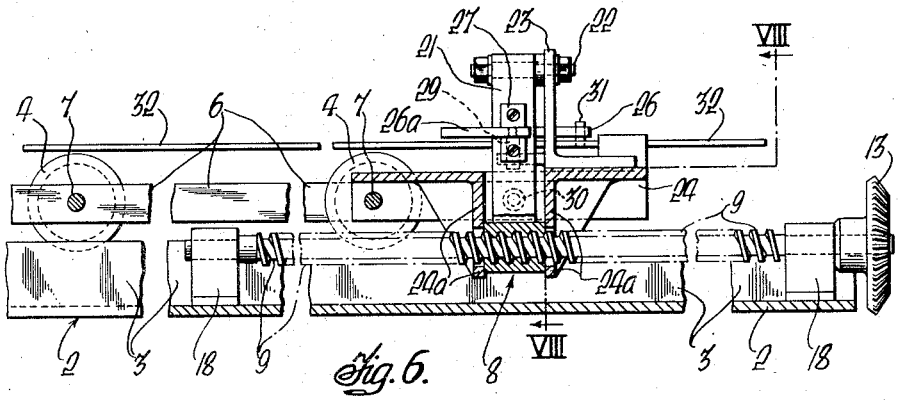
Figure 6 is a contracted side elevation, on an enlarged scale, of means for traversing the work during welding operations.
Figure 7:
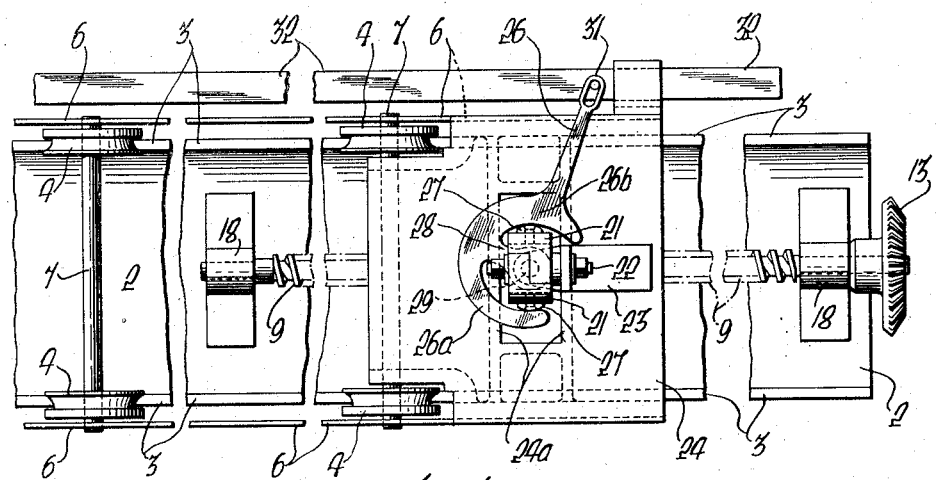
Figure 7 is a plan of Figure 6.
Figure 8:
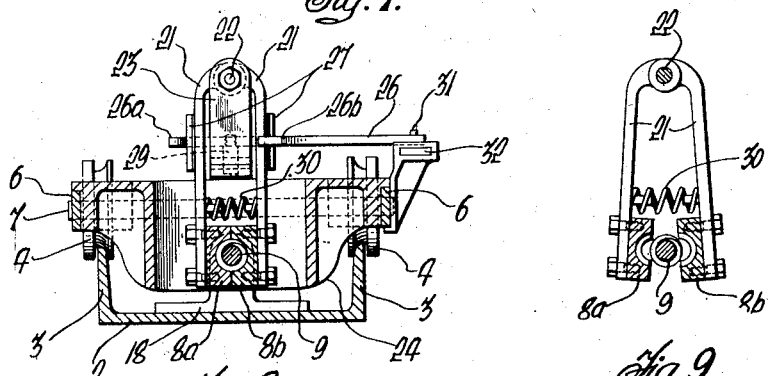
Figure 8 is an end view taken on the line VIII—VIII in Figure 6.

In Figures 1 to 3 the improved apparatus is shown in duplex form, that is to say that it comprises halves or units which are practically identical and are capable of operating independently or simultaneously upon separate pipes or other articles to be jointed. This duplex arrangement enables a single operator to control both units of the apparatus, but it will be hereinafter evident that, if desired, the apparatus may comprise a single unit complete in itself.

Each unit includes a track member which may consist, as seen in Figures 1, 2, 3, 6, 7, 8, 20 and 21, of a channel sectioned girder 2 laid horizontally with its side flanges projecting upwards so that the upper edges thereof provide tracks or rails 3 for a series of carriage rollers 4. These rollers 4, are arranged in series of opposite pairs, for instance, three pairs of the rollers may be suitably spaced lengthwise of the track member 2. The peripheries of the rollers may be suitably grooved to accommodate themselves to the upper edges of the rails 3.

Attached to the rollers 4 is an undercarriage which may be formed by horizontal bars 6 in which the roller axles 7 are suitably journalled. At one end of the undercarriage 6 is a nut member 8 which is adapted to engage a longitudinally extending screw 9 which may be driven in either direction by suitable reversing gears 10 from an electric motor 11 or other suitable driving means. The reversing gears 10 of both units of the apparatus may be mounted upon a common transverse shaft 12 and may be clutched to and declutched from gears 13, one of which is fixed to each screw 9, according to requirements. Separate clutch controlling rods 14, shafts 15, and handles 16, may be provided for the reversing gears, the handles 16 being located adjacent a control station of the apparatus, as well be referred to hereinafter. Suitable reduction gearing and change speed mechanism may be associated with the motor 11.

Figure 9:
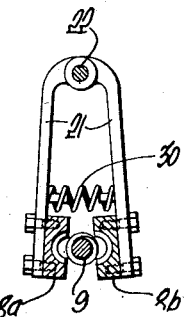
Figure 9 is a detail view showing two halves of a nut member, forming part of the work traversing mechanism, separated and freed from the traversing screw.
Figure 14:
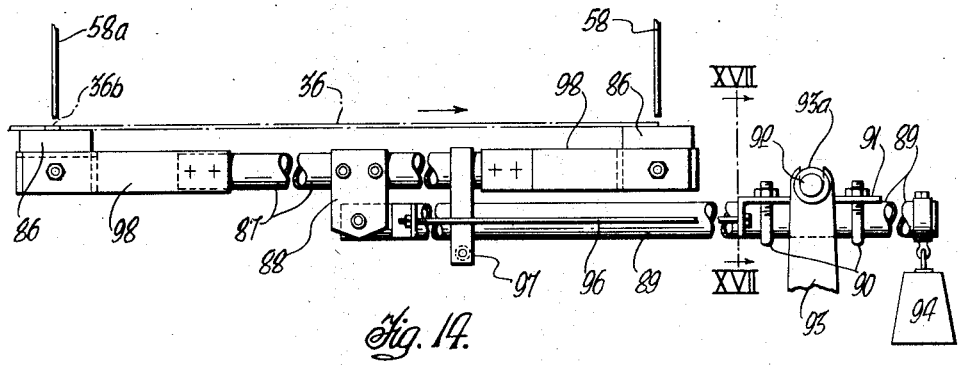
Figure 14 is a contracted side elevation showing interconnected bearers pressed against the underside of the work beneath the electrodes in order to facilitate welding and to increase the efficacy of the welds.
Figure 15:
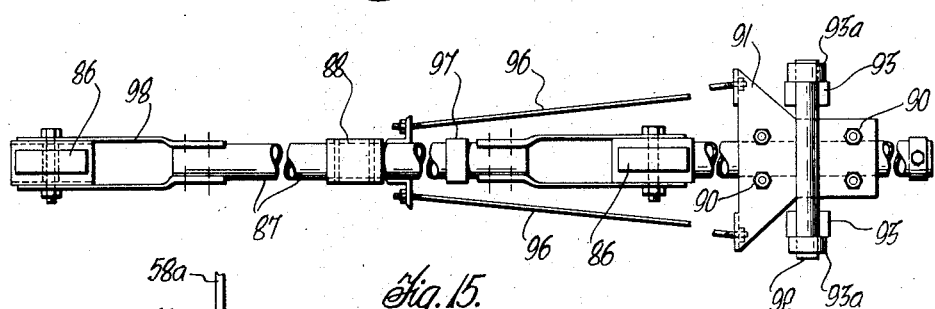
Figure 15 is a plan of Figure 14.

The screw and nut traversing gear is seen more clearly in Figures 6 to 9. Each screw 9, is supported in suitable bearings 18. In order to conveniently release the nut member 8, from the traversing screw so as to permit of a quick return of the wheeled undercarriage, 6, and to permit the latter to remain stationary during the welding of circumferential joints, the nut member may consist of two separate halves or sections 8a, 8b, and a releasing device may be provided whereby the nut sections may be moved apart to release the screw. This releasing device may include a pair of arms 21, each of which carries a nut section, and which are adapted to turn about a pivot pin 22 supported by a bracket 23 upstanding from a frame member 24 to which the forward end portions of the undercarriage bars 6 are secured. The arms 21 may be normally held in such positions that the nut sections 8a, 8b, are engaged with the screw 9, by means of a cam lever 26 having at one end cam like cheeks 26a, 26b, which embrace the arms 21. The arms may be fitted with renewable plates or strips 27 against which the cam faces of the cheeks 26a, 26b, bear. The cam lever may have a boss piece 28 which extends between the cheeks and is pivoted to a pin 29 carried by the bracket 23. A spring 30 may be arranged in such manner as to tend to force the arms 21 apart and so free the nut sections from the screw 9, when the cam lever 26 is moved to a releasing position. The cam lever may be connected by a pin and slot device 31 or the like to an operating rod 32 which extends longitudinally so that it may be easily manipulated by an attendant at the control station of the apparatus. The nut sections 8a, 8b, may be guided in their to and fro motions by flanges 24a, of said frame member 24. The cam lever 26 is swung to the left from the position indicated in Figure 7 to release the nut sections which then assume positions as seen in Figure 9.

Resting freely upon the undercarriage rollers 4 is an upper or work carriage 33 which is also preferably formed by a channel sectioned girder, but in this case the girder is arranged in an inverted attitude, as seen more clearly in Figures 3, 4, 5, and 21, whereby its downwardly projecting side flanges 33a, rest in the grooved peripheries of the rollers 4, which thus support the work carriage. This work carriage is fitted at desired longitudinally spaced positions with devices indicated at 34 in Figures 1 and 3, to support the work which is represented in the drawings by a metal pipe blank 36 in cases where the meeting longitudinal edges are to be welded together, or by a number of axially aligned pipe sections 36a in which case the abutting ends of the sections are to be welded circumferentially in order to unite the pipe sections. Before placing the pipe or the pipe sections onto the carriage 33, the longitudinal or circumferential meeting edges of the pipe or sections are preferably tack welded.

The work holders are preferably of a self-centering nature and according to the embodiment illustrated in Figures 4 and 5 they each comprise a pair of arms 37 pivotally attached at their lower ends to brackets 38 on the upper or work carriage 33 and extending upwardly in cross formation. The arms 37 may have longitudinal slots 39 and are connected at the intersection by a bolt or pin 41 which passes through the slots 39 and may be tightened up when the arms have been adjusted to suit the diameter of the pipe or the like to be operated upon. If desired opposite upwardly inclined arms 42 indicated by broken lines in Figure 5 may be fixed to the carriage 33 or the brackets 38 to support the work in instances where pipes or articles of relative large or of uniform diameter have to be operated upon.

By the foregoing arrangement, as the undercarriage 6 and its rollers 4 are moved longitudinally upon the track member 2 by the screw and nut gear, the upper carriage 33 resting upon said rollers is traversed with the work 36 at a speed which is approximately double the speed of the undercarriage 6.

Figure 20:
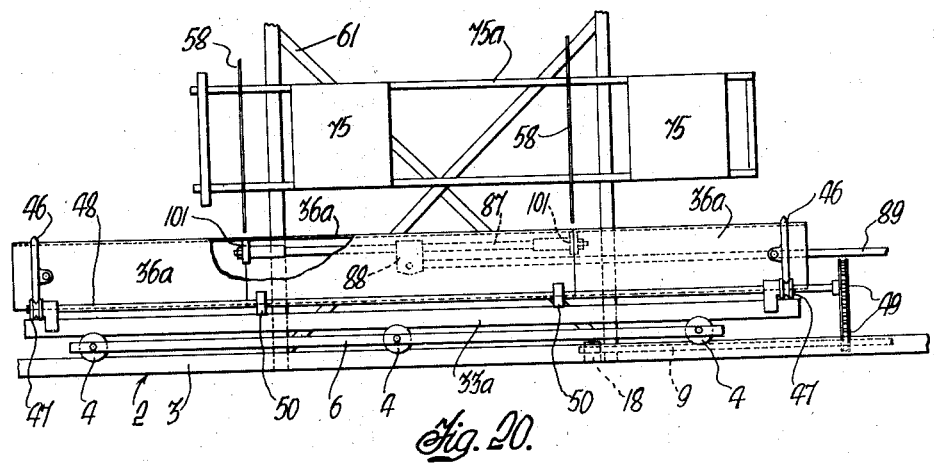
Figures 21, 22:
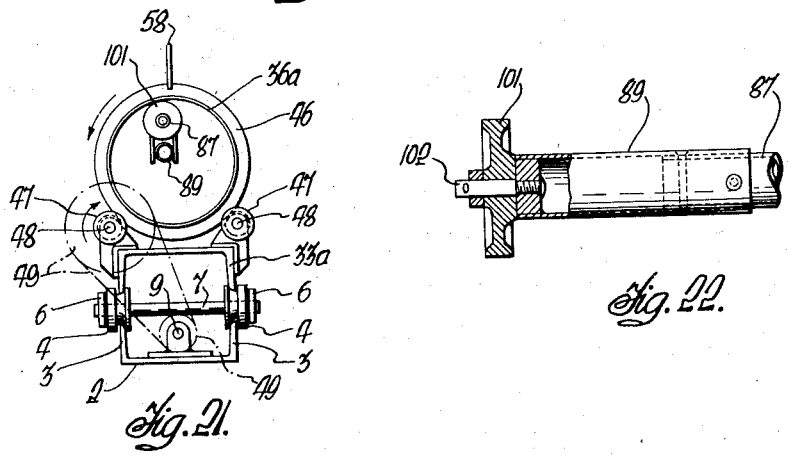
Figure 21 is a fragmentary rear end view of Figure 20 showing the means for supporting and rotating a pipe or the like, during the welding of a circumferential joint.
Figure 22 is a detail view of a free wheel bearer and mounting means therefor as seen in Figures 20 and 21.

In order to traverse circumferentially a number of pipe sections 36a which are to be welded together at their abutting ends to form a pipe, runner wheels or flanges 46 may be clamped around the exterior of the pipe sections, as indicated in Figures 20 and 21, and adapted to run in the grooved peripheries of driving and supporting rollers 47 mounted on longitudinal shafts 48 extending one at each side of the carriage 33. Either or both of these longitudinal shafts may be driven by suitable gearing or connections 49 from the aforesaid traversing screw 9 or any other convenient element, when it is desired to rotate or circumferentially traverse work in the welding of circumferential points. At such periods longitudinal movement of the carriages 6 and 33 may be obviated by releasing or removing the aforesaid nut member 8 from the screw 9 as before mentioned. Wheels 50 may be mounted at suitable positions along the shafts 49 to support the pipe sections intermediately of their length.

Figure 23:
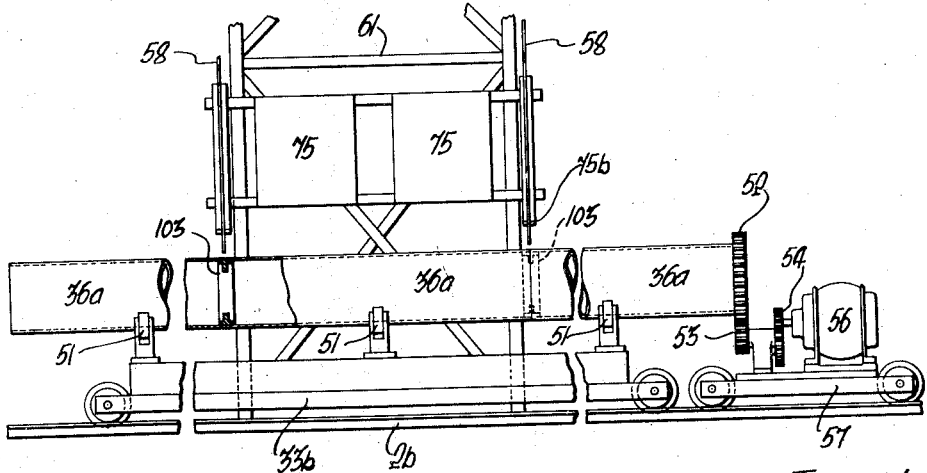

To carry out circumferential welding operations it may be more advisable to employ a slightly modified apparatus, as illustrated in Figure 23, wherein a wheeled carriage 33b is adapted to move along a pair of rails 2b, and is provided at appropriate positions with work holders such as free rollers 51. In this instance the outer end of one of the pipe sections 36a may be detachably fitted with a toothed ring 52, or a chuck, adapted to be engaged and driven by a pinion 53, or an intergaging chuck, driven at the required speed by suitable reduction gearing 54 operatively connected to an electric motor 56, which may be mounted on a trolley 57 adapted to be wheeled into and out of operative position.

In all instances the invention contemplates the simultaneous application of a plurality, preferably two, of electrodes to the work at different points, whether forming a longitudinal joint or a plurality of circumferential joints.

At the commencement of operations in the case of longitudinal joints, one electrode 58 may be positioned over one extremity of the pipe blank 36 in alignment with the track of the joint, whilst another electrode 58a may be positioned over the joint and approximately midway of the length of the pipe, as indicated at Figures 1 to 3 and 14 and 18, the work in such instance being traversed from left to right whilst the electrodes are fed to the work at the required rate. By the simultaneous use of a plurality of electrodes at different points along the same joint, the meeting edges of the pipe blank 36 are simultaneously drawn together at one point. Consequently the stresses to which the molten material is subjected, due to its contraction during solidification, are considerably lessened, and a more secure and efficient joint is obtained. Although the drawings show two electrodes for each longitudinal joint it will be evident that three or more electrodes may be applied simultaneously at different points along the same joint so that the stresses will be even further reduced. Apart from the reduction in stresses along the joint and the resultant stronger joint, the simultaneous use of a plurality of electrodes reduces the time required to form the joint, by an amount which will be proportionate to the number of electrodes employed.

Figure 16:
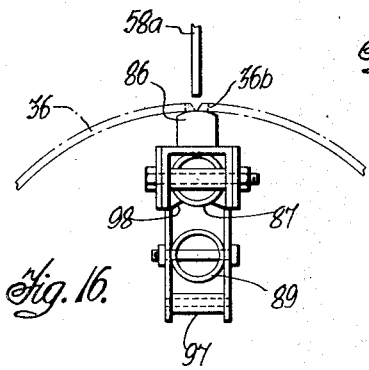
Figure 16 is a left-hand end view, on an enlarged scale, of Figure 1, certain parts being omitted.
Figure 17:
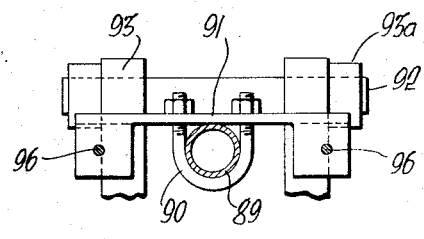
Figure 17 is an enlarged cross section on the line XVII—XVII in Figure 14.

In order to facilitate the initial deposition of metal from any electrode which at the commencement of welding operations is disposed intermediately of the length of the joint to be formed, and also to prevent the initially deposited metal from forming a protuberance on the exterior of the work, the latter may be provided at a point immediately beneath such intermediate electrode with a hole or cavity 36b (see Figures 1, 14 and 16) to receive the initially deposited metal.

Important advantages are also obtained when a number of electrodes are employed simultaneously to effect a plurality of circumferential joints, as in joining the abutting ends of three or more pipe sections (see Figures 20 to 23). In this application of the invention the main advantage is the saving in time as two or more joints may be made in the same time, as is entailed at present to form one joint. The joints will also be uniform.

Each electrode is preferably fed to its work by means of a hydraulic ram or plunger 59 moving in an inverted vertical cylinder 60 adjustably mounted in a suitable framework 61. Referring more particularly to Figures 10, 11 and 12 each cylinder may be provided at its lower end with a stuffing box 62 and a gland 63 through which the plunger rod 64 passes. The stuffing box may be supported by cross bars 65 of the framework 61. At a point intermediately of its height each cylinder may be encircled by a bracket or holder 66 capable of being secured in various adjusted positions to an upper cross bar 67. The bracket 66 and the cross bar 67 may be provided with slots 66a, 67a, extending in substantially cross formation, through which bolts 68 may be passed. Longitudinal and transverse adjustments of the position of each cylinder 60 may thus be obtained to suit working conditions.

Each electrode 58 may be connected to the slidable core 69a of an arc striking solenoid 69 which may be secured to the lower end of the respective plunger rod 64 which is preferably fitted with a hood 70 to protect the solenoid and the electrode from any fluid which may escape from the cylinder 60. The downward movement of the core 69a may be limited by a stop as at 85. The hood 70 may have a gutter 71 at its lower end from which a drain pipe 72 may lead.

The cylinder may be charged with water or other suitable liquid by way of a pipe 73 leading from a source of supply to an opening 74 near the bottom of the cylinder, the charging of the cylinder raising the plunger 59 and its rod 64.

To enable the electrode to be fed downwardly to the work under the influence of gravity acting on the plunger 59, provision is made for allowing the fluid to escape from the cylinder 60 as hereinafter referred to. Each pipe 73 leading from a source of fluid to a cylinder 60 has a discharge pipe circuit which may be arranged upon a panel or board 75. (See Figures 1, 13, 20 and 23) mounted in a convenient position upon the framework 61. This discharge circuit may comprise a main or first discharge pipe 76 which leads from the pipe 73 to a suitable discharge, and a by-pass discharge pipe 77 connected at its ends to the pipe 76. A regulating valve 78 is interposed in the pipe 76 and is operatively connected to a centrifugal governor 79 driven by a comparatively small series wound motor 81 which is connected in the electric welding circuit in a manner similar to that disclosed in the specification of my U. S. Patent No. 1,662,858, dated March 20, 1928 whereby the escape of fluid from the cylinder 60 through the pipe 76 and past the valve 78 and, consequently, the rate of downward feeding of the associated electrode, is automatically controlled in accordance with any fluctuations in the arc length. A steady and reliable feed of the electrode is thus ensured.

The pipes 76 and 77 may be fitted with manually controlled valves 82, 83 respectively, valve 82 being open and valve 83 being closed when it is desired that the governor 79 should control the electrode feed. To cut out the governor from the feed control and thus enable the electrode to be speedily lowered, as may be required at the starting of a weld, the valve 82 may be closed and the valve 83 opened, whereby the fluid from the cylinder may flow without restriction though the by-pass pipe 77 to the outer or final section of the discharge pipe 76. A control valve 84 may also be fitted in the pipe 73 beneath the discharge circuit 76, 77, this valve 84 being closed except when the cylinder is being charged with fluid. Panels 75 each supporting control devices as aforesaid may be mounted in a group upon a suitable frame or frames 75a as indicated in Figures 1 and 3 within easy reach of a single attendant. A guide 75b may be provided for the lower end portion of each electrode.

In order to afford temporary support for the molten metal as it is deposited from each electrode at the arcing point, and to exercise a chilling effect upon the molten metal, I may provide for each electrode a bearer or backing member which is held or pressed against the underside of the work beneath the respective electrode. According to one embodiment each of said bearers consists of a copper or other suitable block 86 (Figures 1, 2, 3, 14 and 15 and 16) which preferably has a transversely rounded upper surface and is longitudinally adjustable upon an end portion of a tube or bar 87 which extends beneath the longitudinal joint of a sheet metal pipe. The bar 87 is pivotally connected, midway of its length, by means of a bracket 88 or the like to the inner end of a tubular or other suitable supporting lever 89 which passes longitudinally out of one end of the pipe and may be held intermediately of its length by U bolts 90 to a plate 91 carrying a transverse trunnion 92 supported by bearing brackets 93.

A weight 94 or a spring or screw device, may be associated with the outer end portion of this supporting lever 89, whereby the bearers 86 which are disposed within the pipe are pressed upwardly against the pipe joint being formed. Longitudinal stay rods 96 may be provided at each side of each supporting lever 89, and a suitable stop 97 may be provided to limit the swinging movement of the bar 87 about its intermediate pivot 88. If desired each bearer 86 may be carried by a sleeve or hollow member 98 which may be secured to the bar 87 at desired longitudinal positions.

According to a modification each bearer may consist of a free wheel or roller 101 (see Figures 18 to 22) the periphery of which is adapted to engage the underside of the work beneath the respective electrode. The periphery of each free wheel may be convex, flat or other suitable contour according to the nature of the work which it is to engage. The free wheel bearers may be mounted to turn about axles 102 carried by the respective sleeves 98, such axles extending transversely, as seen in Figures 18 and 19, when used for longitudinal joints, and extending longitudinally of the bar, as seen in Figures 20 to 22, when employed in connection with the formation of circumferential joints.

In order to adjust the position of said bearers, longitudinally or laterally in relation to their associated electrodes, according to whether a longitudinal or a circumferential joint is to be formed, the sleeves 98 may be adjusted along the bar 87 and the trunnion 92 may be adjusted laterally in its bearing brackets 93 and held in adjusted position by collars 93a. Means may also be provided for adjusting the pressure of the aforesaid weight 94, spring or screw device whereby the desired degree of pressure may be applied to the bearer blocks or wheels. The surfaces of the bearers are thus retained in contact with the underside of the work so that the deposited molten metal is supported and chilled. Where free wheels are employed as bearers they may be rotated by frictional contact with the work as the latter is traversed in relation to the electrodes. Thus a relatively cold portion of each wheel periphery is continuously coming into contact with the molten metal as it is fused at the arcing point and thus thereby exercises a chilling effect upon the molten material.

Figure 18:
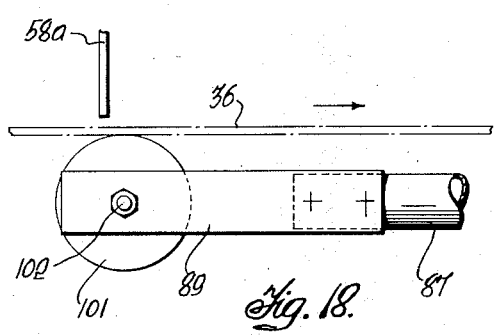
Figure 18 illustrates a modified bearer in the form of a wheel.
Figure 19:
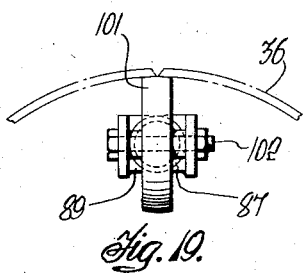
Figure 19 is an end view of Figure 18.

By the provisions of a free wheel bearer or bearers 101 pivotally and adjustably mounted as aforesaid it is possible to arrange the centre of each wheel slightly in advance of the electrode point, as indicated in Figure 18, so that a slight space exists between the underside of the work and the periphery of the wheel at the welding point. This arrangement of the wheel in relation to the electrode produces highly satisfactory results in that sufficient space is allowed for the molten metal to fall slightly beneath the work and between the latter and the periphery of said wheel 101 which supports the molten metal, thus ensuring proper penetration of the fused metal so that an efficient weld is formed. By adjusting the free wheel 101 in relation to the electrode 58 as aforesaid the vertical centre of the wheel may be placed at a greater or lesser distance in advance of the electrode, thus providing a correspondingly greater or lesser space between the underside of the work and the periphery of the free wheel at the welding point, according to circumstances such for instance as the nature of the work or the thickness of the metal to be welded.

When carrying out circumferential welding operations, instead of employing free wheel bearers 101 as before mentioned, bearers in the form of rings 103 may be inserted within the pipe sections, so as to bear snugly against the internal surface of the latter, in alignment with the circumferential joint to be formed, as seen in Figure 23. At the conclusion of the welding action such bearer rings are removed from the pipe.

It is to be understood that the invention is not limited in application to pipes and hollow bodies but may also be utilized to weld separate sections or members together, wherein each electrode forms a part of a continuous welded joint uniting such sections or members. The terms "work" and "work piece" employed hereinbefore and in the appended claims are therefore intended to include separate sections or members which are to be welded together to form a single article or body.

Furthermore, although it is considered preferable to traverse the working when forming longitudinal joints, the work may, if desired, be held stationary whilst the electrodes and their feeding devices are traversed longitudinally over the work, and it is intended and desired that such traversing of the electrodes and their feeding devices shall, wherever applicable, fall within the scope of the appended claims.

Having now described my invention what I claim as new and desire to secure by Letters Patent is:—

1. A method of electric arc welding which consists in simultaneously effecting a plurality of welds on the same work piece by traversing the work relatively to a plurality of electrodes which are arranged above and simultaneously fed towards the work at the respective welding points thereon, and forming a hole or cavity in the work on the line of the joint to be formed and at a position immediately beneath one of said electrodes which, at the commencement of operations, is disposed intermediately of the length of said joint for the purpose specified.

2. In electric arc welding apparatus the combination of a vertically arranged hydraulic cylinder and plunger therein, an arc striking solenoid attached to the lower end of the plunger rod and adapted to receive the upper end of an electrode, and electromechanical means connected into the arc circuit and adapted to automatically control the escape of fluid from said cylinder whereby said plunger and the electrode are fed downwardly towards the work by gravity in accordance with fluctuations in the length and voltage of the welding arc.

3. In electric arc welding apparatus, a work traversing device comprising an undercarriage mounted on runner wheels, an upper carriage resting freely upon and driven by frictional contact with said runner wheels, said upper carriage being adapted to support the work during welding operations, and means for traversing said undercarriage, for the purpose set forth.

4. In electric arc welding apparatus, a work traversing device comprising an undercarriage mounted on grooved runner wheels, a base or track member of channel shape in cross section the side flanges of which engage and support said runner wheels, an upper carriage of inverted channel shape in cross section having side flanges the lower edges of which rest in the grooved peripheries of said runner wheels whereby the upper carriage is driven by frictional contact with said wheels, said upper carriage being adapted to support the work during welding operations, and means for traversing said undercarriage for the purpose set forth.

5. In electric arc welding apparatus, a work traversing device comprising an undercarriage mounted on runner wheels, an upper carriage resting freely upon and driven by frictional contact with said runner wheels, said upper carriage being adapted to support the work during welding operations, means for traversing said under carriage, and means for releasing the undercarriage from said traversing means for the purpose set forth.

6. In electric arc welding apparatus, a work traversing device comprising an undercarriage mounted on runner wheels, an upper carriage resting freely upon and driven by frictional contact with said runner wheels, said upper carriage being adapted to support the work during welding operations, means comprising a screw and a divided nut, for traversing said undercarriage, and a releasing device adapted for freeing said divided nut from said screw for the purpose specified.

7. In electric arc welding apparatus, a work traversing device comprising an under carriage mounted on runner wheels and an upper carriage resting freely upon and driven by frictional contact with said runner wheels, said upper carriage being adapted to support the work during welding operations, means comprising a screw and a divided nut for traversing said under carriage, the sections of said nut being attached to pivoted arms on said under carriage, and means for closing said sections upon and releasing them from said screw for the purpose specified.

8. In electric arc welding apparatus a work supporting carriage having at spaced intervals in its length, work holders which consist of crossed arms pivoted at their lower ends to the work carriage and an adjusting member connecting said arms at their crossing points.

9. In electric arc welding apparatus, the combination of a work supporting carriage, means for traversing the work thereon relatively to one or more electrodes an intermediately pivoted hold-up lever extending longitudinally above said carriage, a bearer or backing member supported by said lever and adjacent one end thereof, and means acting on said lever to force said bearer or backing member upwardly against and beneath the surface to be welded for the purpose specified.

10. In electric arc welding apparatus the combination of a work supporting carriage, means for traversing the work thereon relatively to one or more electrodes, an intermediately pivoted hold-up lever extending longitudinally above said carriage, a longitudinal bar intermediately pivoted on one end of said hold-up lever, a bearer or backing member mounted on each end of said bar, and means acting on the other end portion of said lever to force said bar upwardly and thereby press said bearers or backing members against the under-side of the part to be welded for the purpose specified.

11. In electric arc welding apparatus, the combination of a work supporting carriage, means for traversing the work thereon relatively to one or more electrodes, an intermediately pivoted hold-up lever extending longitudinally above said carriage, a bearer or backing member supported by said lever adjacent one end thereof and longitudinally adjustable in relation thereto, and means acting on said lever to force said bearer or backing member upwardly against and beneath the surface to be welded, for the purpose specified.

12. In electric arc welding apparatus, the combination of a work supporting carriage, means for traversing the work thereon relatively to one or more electrodes, an intermediately pivoted hold-up lever extending longitudinally above said carriage, a bearer or backing member supported by said lever adjacent one end thereof, and means for exerting a downward pressure upon the other or outer end portion of said lever whereby the opposite or inner end thereof supporting said bearer or backing member is forced upwardly towards the underside of the part being welded for the purpose specified.

13. In electric arc welding apparatus, an electrode feeding device comprising a vertically arranged hydraulic cylinder, means for releasing hydraulic fluid from the lower part of said cylinder, a plunger operating in said cylinder and connected and arranged to feed the respective electrode downwardly by gravity during such release of the hydraulic fluid, and means for automatically controlling such release of the hydraulic fluid and the resultant gravity feed of the electrode in accordance with current fluctuations at the welding arc.

14. In electric arc welding apparatus, an electrode feeding device comprising a vertically arranged hydraulic cylinder, a regulating valve connected to the cylinder for automatically releasing hydraulic fluid from said cylinder, a centrifugal governor operatively connected to and adapted to operate said valve in accordance with reciprocal movements of said governor, an electric motor connected into the arc circuit and arranged to drive said governor, and a plunger operating in said cylinder and adapted to feed the electrode downwardly by gravity as the hydraulic fluid is thus released from the cylinder.

15. In electric arc welding apparatus, an electrode feeding device comprising a vertically arranged hydraulic cylinder, means for automatically releasing the hydraulic fluid from the lower part of said cylinder, a plunger operating in said cylinder and adapted to feed the electrode downwardly by gravity during such release of the hydraulic fluid, and an arc striking solenoid attached to the lower end of said plunger rod and adapted to carry the electrode.

16. In electric arc welding apparatus, an electrode feeding device comprising a vertically arranged hydraulic cylinder, means for releasing hydraulic fluid from the lower part of said cylinder, a plunger operating in said cylinder and arranged to feed the electrode downwardly by gravity during such release of the hydraulic fluid, an arc striking solenoid attached to the lower end of the plunger rod and adapted to carry the electrode, and a protective hood fitted to the lower portion of the plunger rod immediately above said solenoid.

17. In electric arc welding apparatus, an electrode feeding device comprising a vertically arranged hydraulic cylinder, a regulating valve connected to the cylinder for automatically releasing hydraulic fluid from the lower part of said cylinder, a centrifugal governor operatively connected to and adapted to operate said valve in accordance with reciprocal movements of the governor, an electric motor connected into the arc circuit and arranged to drive said governor, a plunger operating in said cylinder and connected to and arranged to feed the electrode downwardly by gravity as the hydraulic fluid is thus released from the cylinder, and a bypass discharge pipe circuit having manually operable valves which are adapted to short circuit said automatic regulating valve whereby the fluid may escape unrestrictedly from said cylinder to thereby effect a rapid lowering of the plunger independently of said regulating valve.

In testimony whereof I affix my signature.

WALTER REGINALD HUME.